US012798060B2

(12) United States Patent
Chen

(10) Patent No.: US 12,798,060 B2
(45) Date of Patent: Nov. 17, 2026

(54) SWINGABLE WRENCH

(71) Applicant: FINE FORGE INDUSTRY CORPORATION, Nantou County (TW)

(72) Inventor: Kuo-Lung Chen, Nantou County (TW)

(73) Assignee: FINE FORGE INDUSTRY CORPORATION, Nantou County (TW)

( * ) Notice: Subject to any disclaimer, the term of this patent is extended or adjusted under 35 U.S.C. 154(b) by 264 days.

(21) Appl. No.: 18/737,384

(22) Filed: Jun. 7, 2024

(65) Prior Publication Data

US 2025/0010438 A1 Jan. 9, 2025

(30) Foreign Application Priority Data

Jul. 6, 2023 (TW) ................................ 112125315

(51) Int. Cl.
*B25B 23/00* (2006.01)
*B25B 13/48* (2006.01)

(52) U.S. Cl.
CPC ........ *B25B 23/0028* (2013.01); *B25B 13/481* (2013.01)

(58) Field of Classification Search
CPC .......................... B25B 23/0028; B25B 13/481
USPC ..... 408/1, 8–15, 67, 76, 115, 145, 207, 230, 408/224, 227; 173/81, 90, 140–141, 173/162.1, 197, 198, 213, 168–171; 81/9.4, 177.8, 489
See application file for complete search history.

(56) References Cited

U.S. PATENT DOCUMENTS 5,104,151 A * 4/1992 Adams .................. F16B 43/001 285/39
5,199,335 A * 4/1993 Arnold ................... B25G 1/063 81/177.8
6,148,698 A * 11/2000 Hsieh ..................... B25G 1/063 81/177.8
7,131,356 B2 * 11/2006 Lin ....................... B25B 13/461 81/177.9

(Continued)

FOREIGN PATENT DOCUMENTS

CN 121491956 A * 2/2026 ............. B25B 13/46
DE 202007016930 U1 * 4/2008 ......... B25B 23/0028

(Continued)

*Primary Examiner* — Robert F Long
(74) *Attorney, Agent, or Firm* — MUNCY, GEISSLER, OLDS & LOWE, P.C.

(57) ABSTRACT

A swingable wrench is provided, wherein the swingable wrench includes: a handle including a main body and two ear portions arranged in interval in a first direction and projecting from the main body to define a space; a drive head including a projection inserted in the space; and a pivot structure including two through holes respectively disposed through the two ear portions, a perforation through the projection, a first thread section and a shaft, the first thread section being disposed on an inner surface of one of the two through holes, the first thread section being distanced from a side wall of one of the two ear portions facing the space, the shaft including a second thread section, the shaft being disposed through the perforation and inserted in the two through holes, the second thread section being screwed to the first thread section.

9 Claims, 12 Drawing Sheets

(56) References Cited

U.S. PATENT DOCUMENTS 7,343,837 B1 * 3/2008 Domanico .......... B25B 23/0028 81/177.9
8,413,553 B2 * 4/2013 Chen ...................... B25G 1/063 81/177.8
9,321,157 B2 * 4/2016 Yang ....................... B25B 13/46
9,511,485 B2 * 12/2016 Chang ................. B25B 23/0028
2007/0163402 A1 * 7/2007 Hsieh ..................... B25G 1/063 81/177.8
2007/0204727 A1 * 9/2007 Lee ........................ B25G 1/063 81/177.9
2008/0066587 A1 * 3/2008 Domanico ............. B25G 1/025 81/177.8
2009/0049957 A1 * 2/2009 Chang ................... B25B 13/461 81/177.1
2009/0156335 A1 * 6/2009 Sullivan .................... F42B 6/08 473/583
2009/0169330 A1 * 7/2009 Moore .................. F16B 35/041 411/306
2010/0300252 A1 * 12/2010 Tsai ......................... B25G 1/06 81/177.9
2011/0226099 A1 * 9/2011 Chen ....................... B25B 13/04 81/177.8
2012/0167727 A1 * 7/2012 Chen ...................... B25G 1/063 81/177.8
2013/0269491 A1 * 10/2013 Chang ..................... B25B 23/16 81/177.8
2015/0122087 A1 * 5/2015 Yang ....................... B25B 13/46 81/177.8
2016/0016297 A1 * 1/2016 Chang ................... B25B 13/481 81/177.8
2017/0190029 A1 * 7/2017 Cuesta ................ B25B 23/0028
2020/0169214 A1 * 5/2020 Koch ...................... H02S 30/10
2020/0269408 A1 * 8/2020 Fravor ................... B25G 1/063
2024/0308036 A1 * 9/2024 Ross ................... B25B 23/0028
2024/0399543 A1 * 12/2024 Shih .................... B25B 23/0028
2025/0010438 A1 * 1/2025 Chen ................... B25B 23/0028
2025/0025991 A1 * 1/2025 Adibi ...................... B25B 13/46
2025/0196314 A1 * 6/2025 Su ............................ B25G 3/38

FOREIGN PATENT DOCUMENTS

TW M376389 U * 3/2010
TW M571427 U * 12/2018
TW I894018 B * 8/2025

* cited by examiner

SWINGABLE WRENCH

BACKGROUND OF THE INVENTION

Field of the Invention

The present invention relates to a swingable wrench.

Description of the Prior Art

Compared with the one-piece wrench, the head of the swingable wrench is swingable at a certain angle relative to the handle so that it can flexibly reach into places that are difficult for the one-piece wrench to reach to perform rotation operations. It is common in auto repair and mechanical processing fields. The swingable wrench with its head adjustable at different angles is also conducive to operation for the user in various positions, which saves time and effort.

However, the conventional swingable wrench also has some disadvantages such as high cost, poor durability, and low torque-limit.

The present invention is, therefore, arisen to obviate or at least mitigate the above-mentioned disadvantages.

SUMMARY OF THE INVENTION

The main object of the present invention is to provide a swingable wrench which has large structural strength, better durability and high torque-limit.

To achieve the above and other objects, a swingable wrench is provided, wherein the swingable wrench includes: a handle including a main body and two ear portions, the two ear portions being arranged in interval in a first direction and projecting from the main body to define a space; a drive head including a projection inserted in the space; and a pivot structure including two through holes, a perforation, a first thread section and a shaft, the two through holes being respectively disposed through the two ear portions in the first direction, the perforation being through the projection, the first thread section being disposed on an inner surface of one of the two through holes, the first thread section being distanced from a side wall of one of the two ear portions facing the space, the shaft including a second thread section, the shaft being disposed through the perforation and inserted in the two through holes, the second thread section being screwed to the first thread section so that the drive head is swingable about the shaft.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
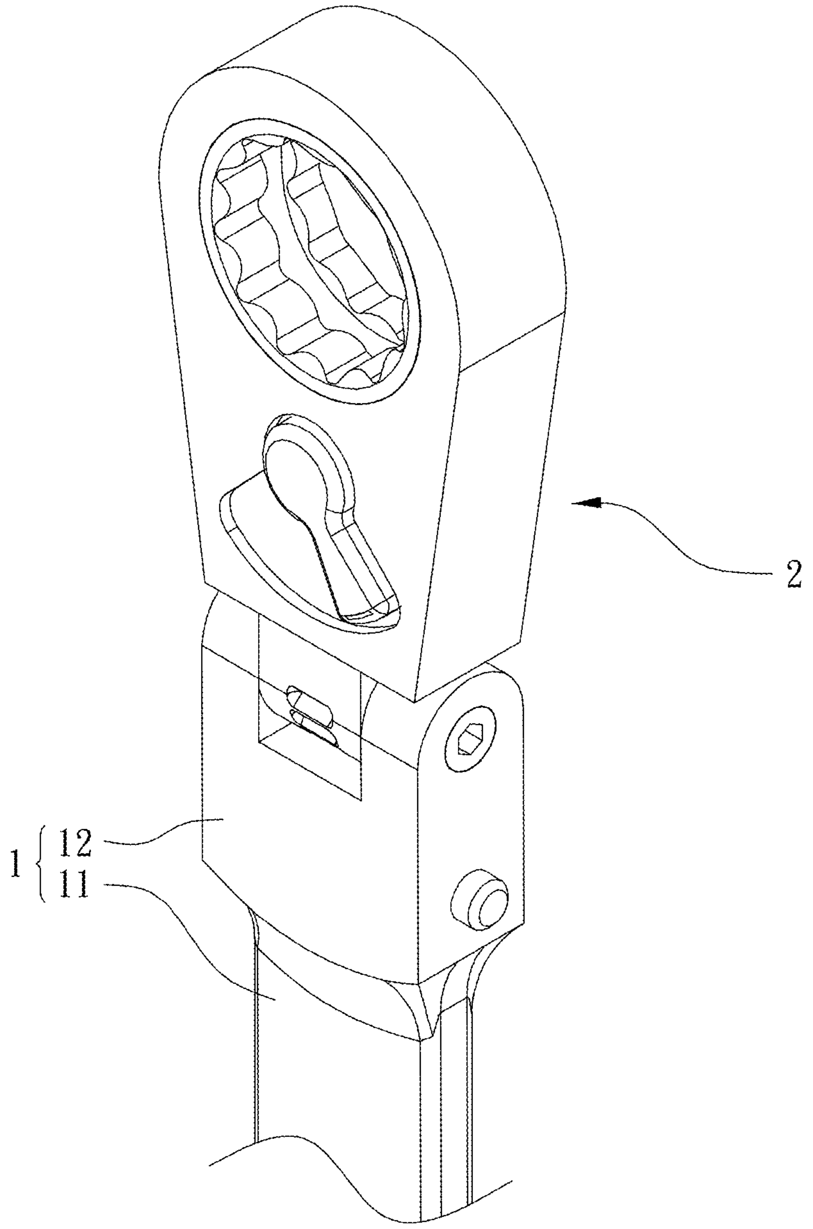
FIG. 1 is a stereogram of a first exemplary embodiment of the present invention.
Figure 2:
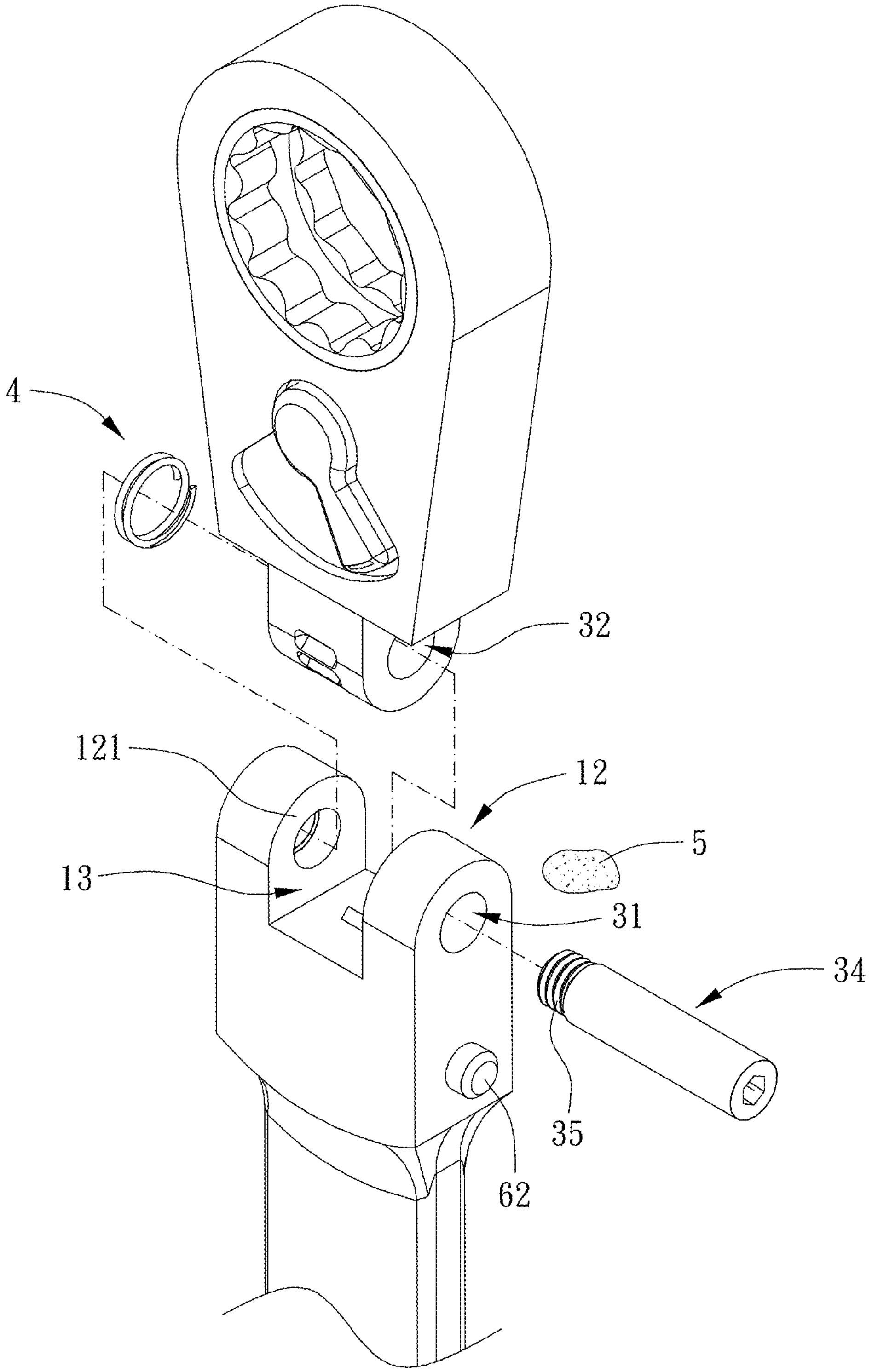
FIG. 2 is a breakdown drawing of the first exemplary embodiment of the present invention.
Figure 3:
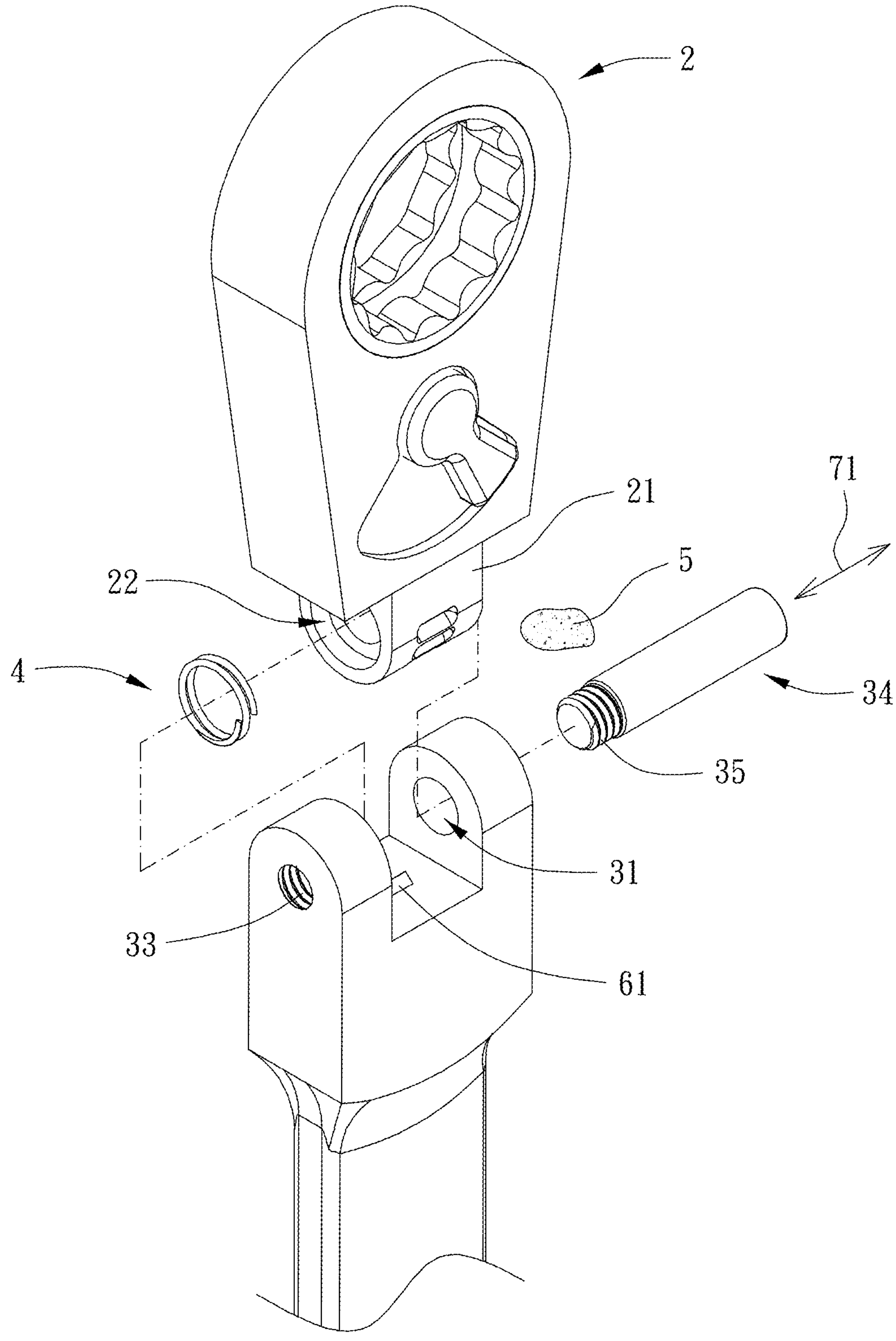
FIG. 3 is another breakdown drawing of the first exemplary embodiment of the present invention.
Figure 4:
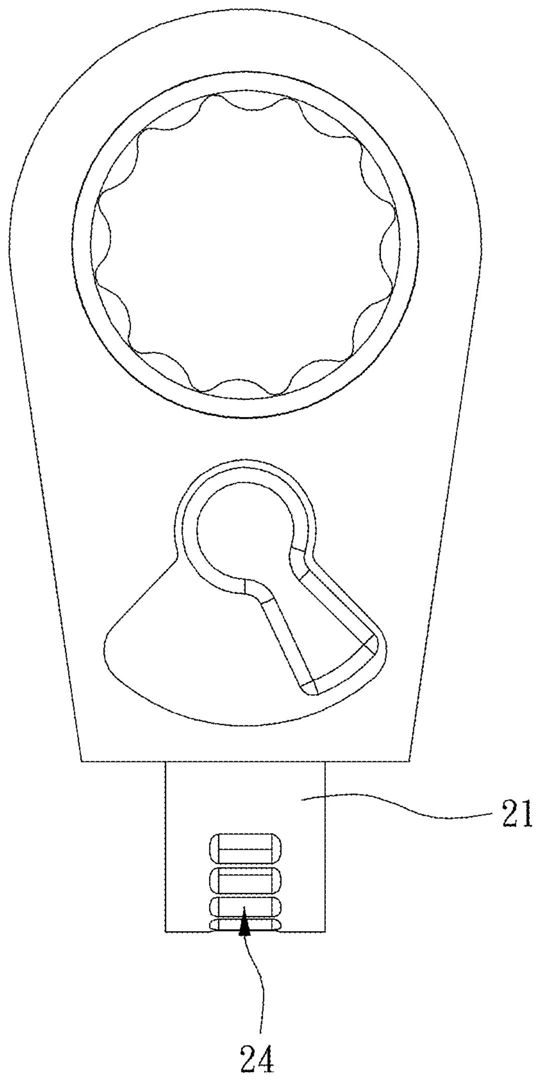
FIG. 4 is a front view of a drive head of the first exemplary embodiment of the present invention.
Figure 5:
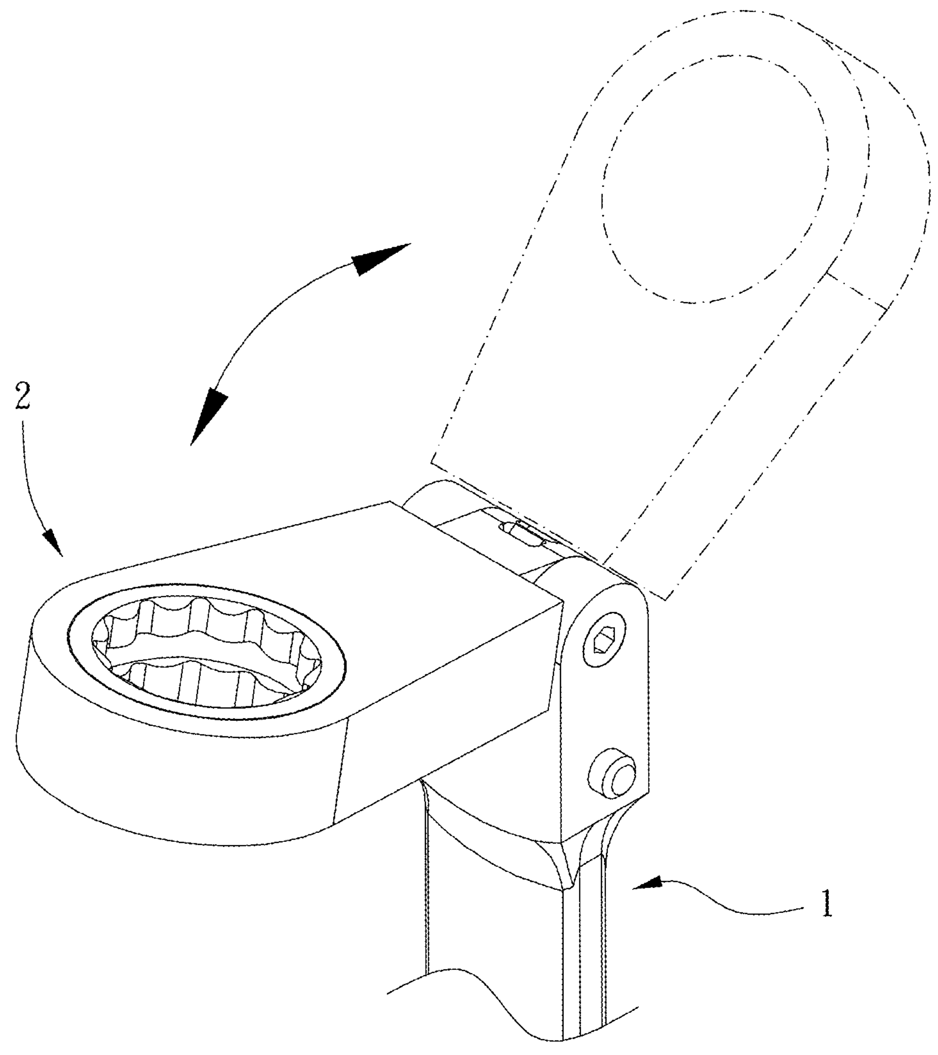
FIG. 5 is a drawing showing the drive head movable relative to a handle according to the first exemplary embodiment of the present invention.
Figure 6:
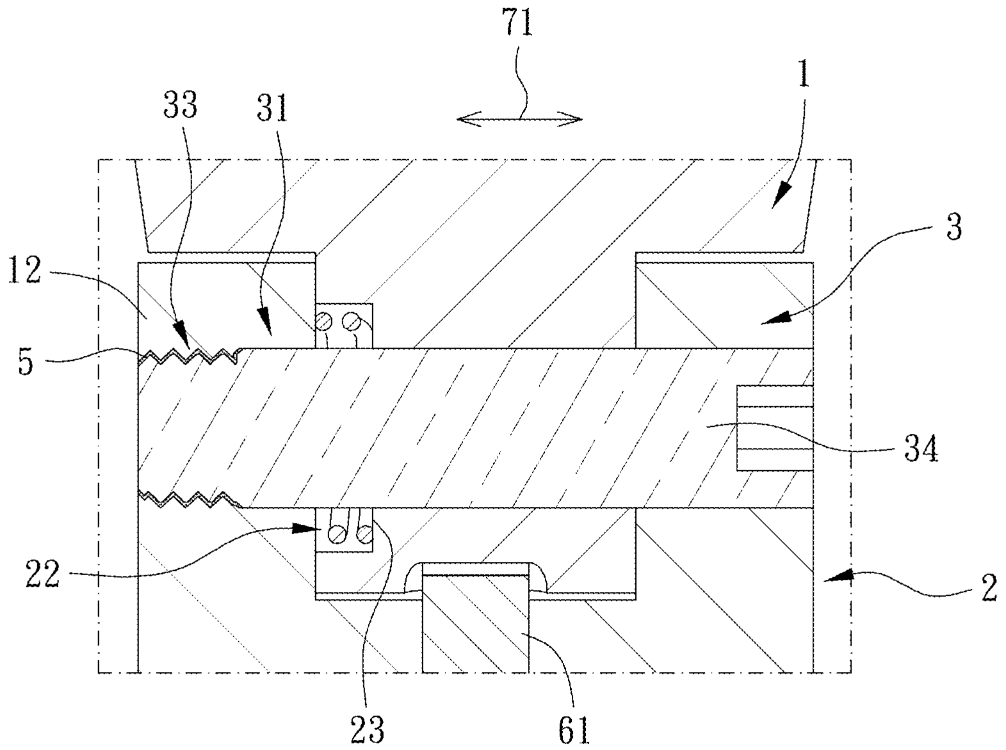
FIG. 6 is a partial enlarged cross-sectional view of the first exemplary embodiment of the present invention.
Figure 7:
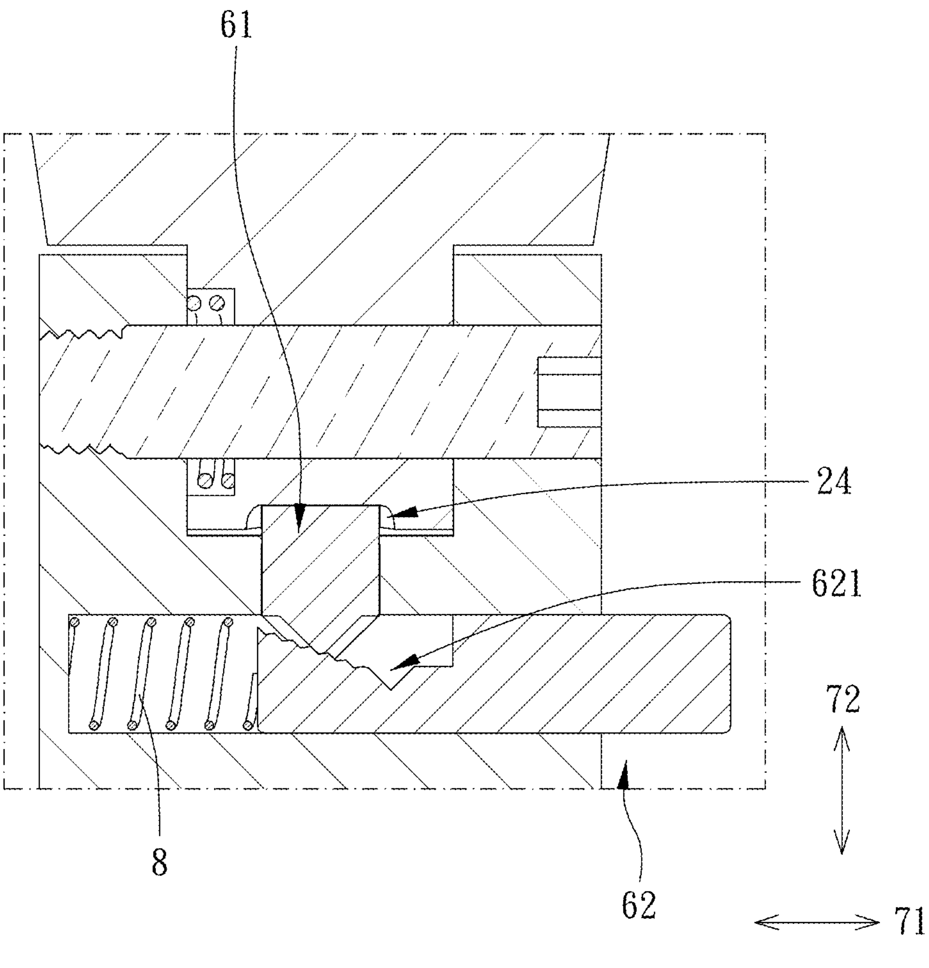
FIG. 7 is a partial enlarged cross-sectional view showing an operation member located in a locked position according to the first exemplary embodiment of the present invention.
Figure 8:
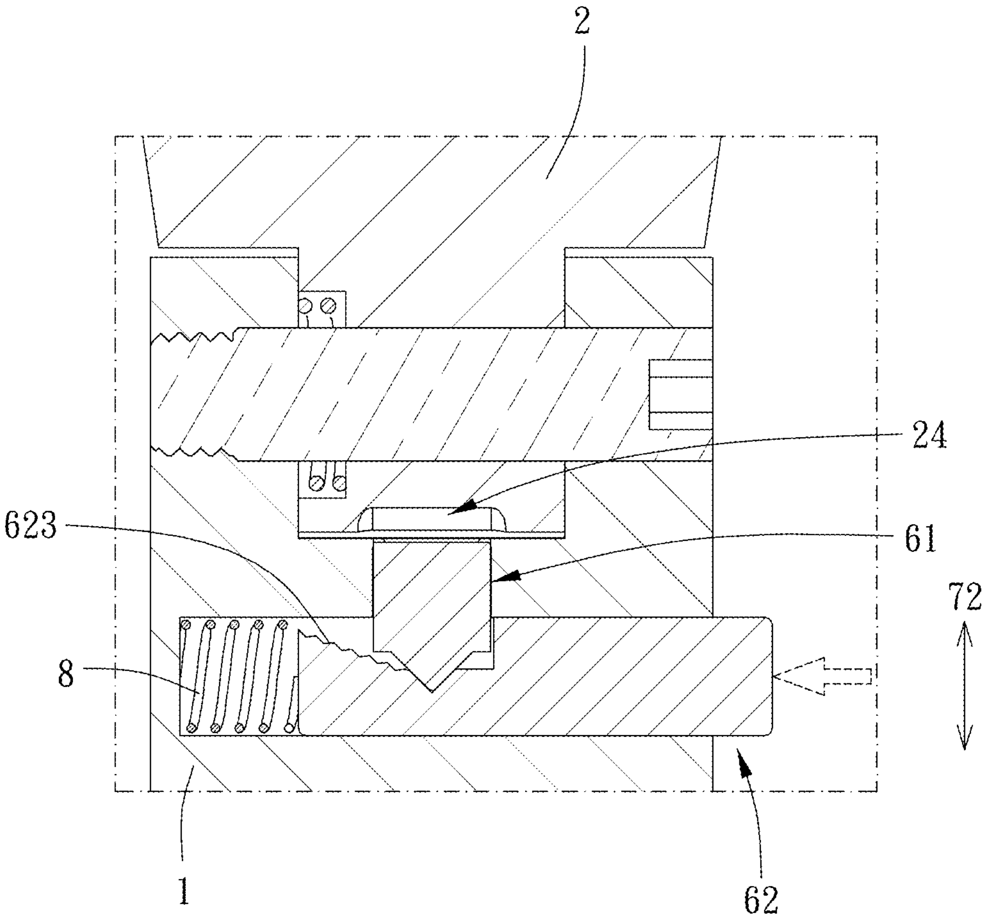
FIG. 8 is a partial enlarged cross-sectional view showing the operation member located in a locked position according to the first exemplary embodiment of the present invention.
Figure 9:
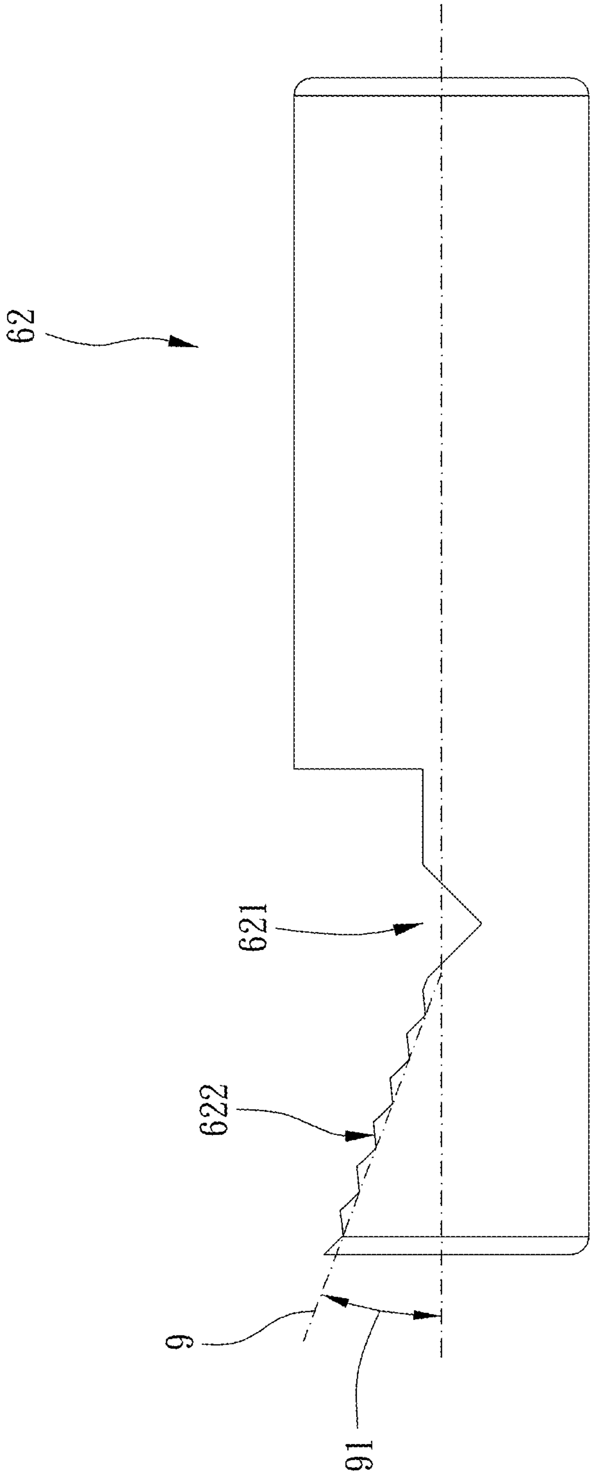
FIG. 9 is a front view of the operation member of the first exemplary embodiment of the present invention.
Figure 10:
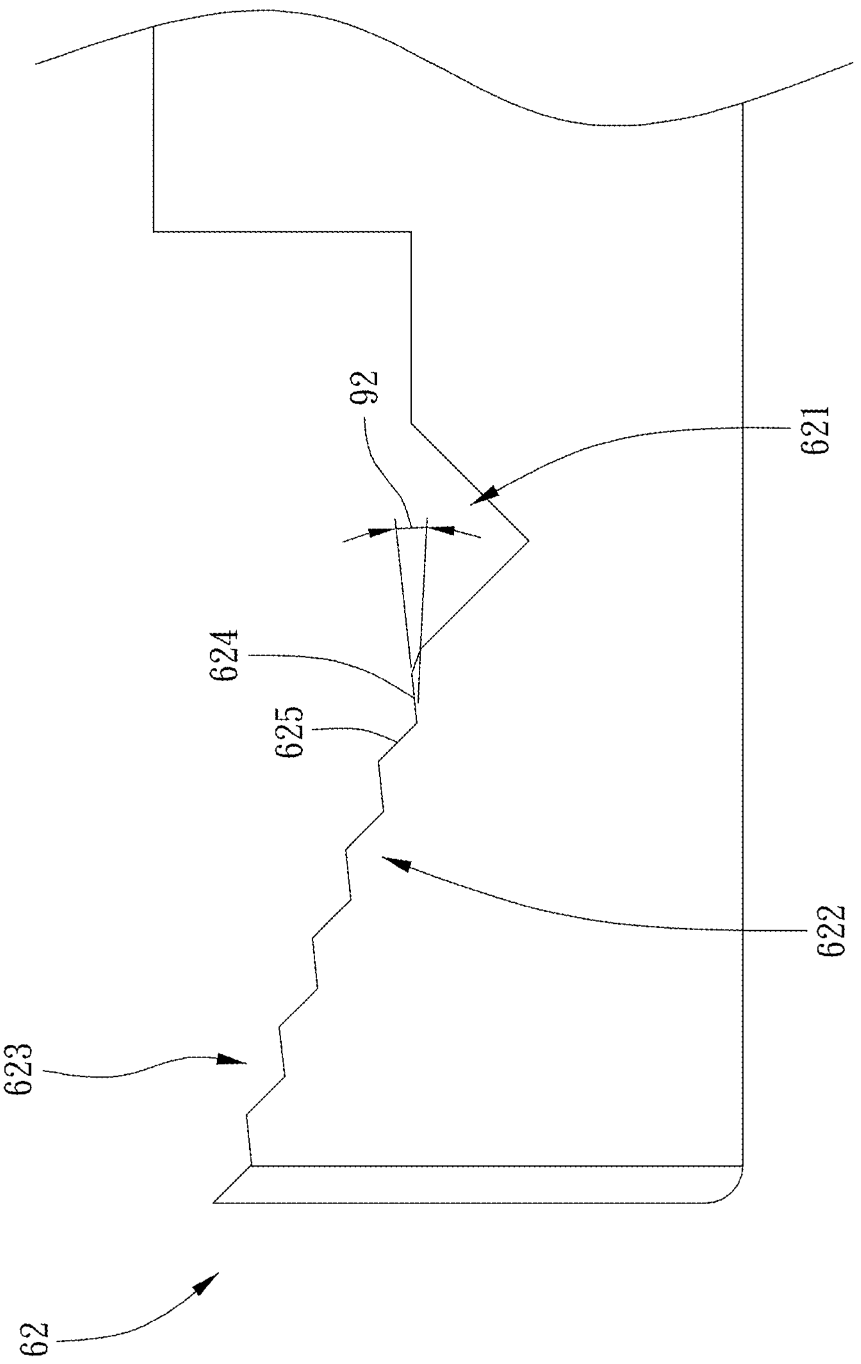
FIG. 10 is an enlargement of FIG. 9.
Figure 11:
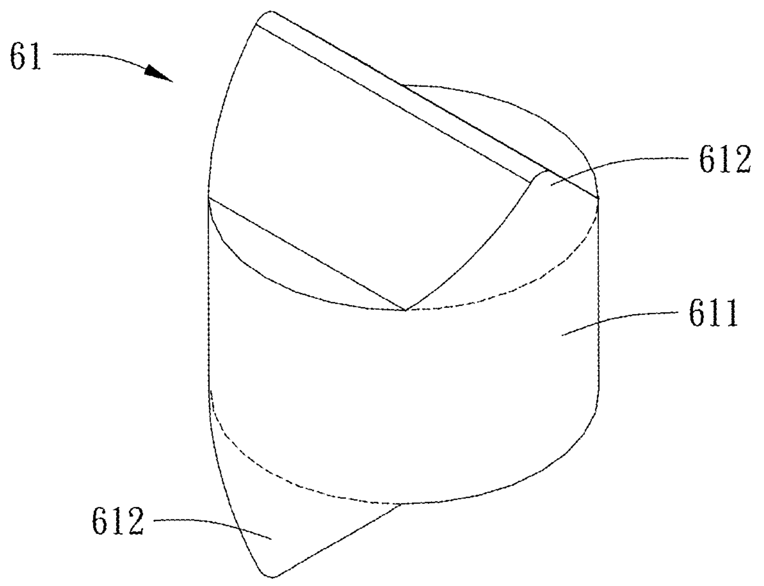
FIG. 11 is a stereogram of a positioning member of the first exemplary embodiment of the present invention.
Figure 12:
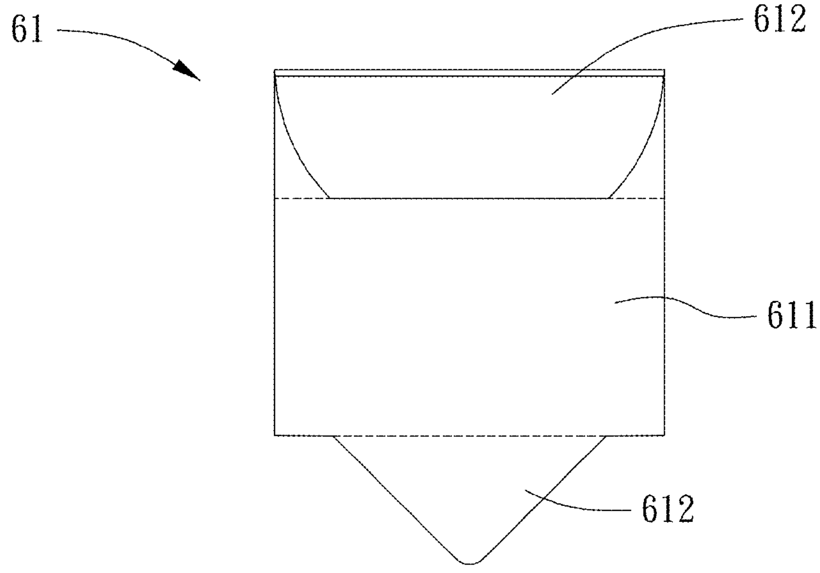
FIG. 12 is a front view of FIG. 11.

Please refer to FIGS. 1 to 12 for a first exemplary embodiment of the present invention. A swingable wrench of the present invention includes a handle 1, a drive head 2 and a pivot structure 3.

Specifically, the handle 1 includes a main body 11 and two ear portions 12, and the two ear portions 12 are arranged in interval in a first direction 71 and projects from the main body 11 to define a space 13. The drive head 2 includes a projection 21, and the projection 21 is inserted in the space 13.

Specifically, the pivot structure 3 includes two through holes 31, a perforation 32, a first thread section 33 and a shaft 34. The two through holes 31 are respectively disposed through the two ear portions 12 in the first direction 71, the perforation 32 is through the projection 21, the first thread section 33 is disposed on an inner surface of one of the two through holes 31, and the first thread section 33 is distanced from a side wall 121 of one of the two ear portions 12 facing the space 13, the shaft 34 includes a second thread section 35, the second thread section 35 is disposed on an end portion of located in the shaft 34, the shaft 34 is disposed through the perforation 32 and inserted in the two through holes 31, and the second thread section 35 is screwed to the first thread section 33 so that the drive head 2 is swingable about the shaft 34.

The first thread section 33 is disposed on a side of the ear portion 12 remote from the space 13 so that it ensures that the side wall 121 of the ear portion 12 facing the space 13 has a relatively complete surface. As such, during operation, the side wall 121 and the projection 21 contact each other in a large contact area in the first direction 71, thus distributing the force uniformly and improving the strength to withstand torsion. This also ensures that the side wall 121 of the ear portion 12 facing the space 13 maintains better structural strength, ensuring that the structure on this side wall 121 will not decrease due to other process such as a secondary penetration (forming the through hole 31 and forming the first thread section 33).

Preferably, in the first direction 71, the first thread section 33 extends for a distance of 0.5 times an axial dimension of one of the two through holes 31, which provides the large structural strength of the ear portion 12 and the strong connection of the shaft 34.

Preferably, the swingable wrench further includes an adhesive 5 (such as NYLOK BLUE patch, Teflon paste or the like. The adhesive 5 is disposed between the first thread section 33 and the second thread section 35, which enhances the connection strength and stability of the shaft 34 and the ear portion 12 so that the shaft 34 is not easy to disengage.

Preferably, the first thread section 33 has a diametric dimension smaller than or equal to a diametric dimension of the through hole 31 so that it make the hollow structure of the ear portion 12 smaller and ensures that the ear portion 12 has a more complete structure. In the first embodiment, the diametric dimension of the first thread section 33 is smaller than the diametric dimension of the through hole 31.

Figure 13:
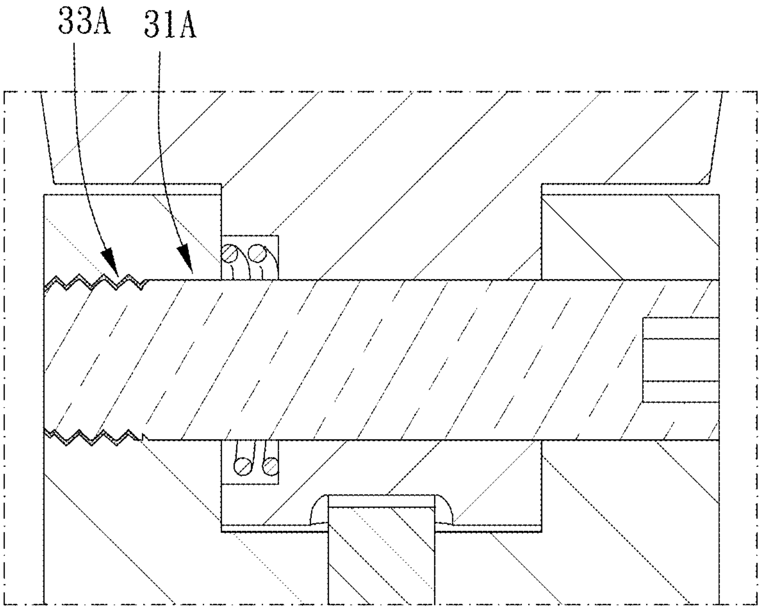
FIG. 13 is a partial enlarged cross-sectional view of a second exemplary embodiment of the present invention.

However, the diametric dimension of the first thread section 33A may be equal to the diametric dimension the through hole 31A (in a second embodiment as shown in FIG. 13).

Preferably, the swingable wrench further includes a positioning member 61 and an operation member 62. The drive head 2 further includes a plurality of positioning holes 24, the plurality of positioning holes 24 are disposed in intervals on an outer surface of the projection 21 and around the perforation 32, the positioning member 61 is disposed on the handle 1 and is movable to be within the space 13 to engage in one of the plurality of positioning holes 24 to lock the drive head 2, and the operation member 62 is movably disposed on the handle 1 and movable with the positioning member 61. As such, the drive head 2 can be locked or released by controlling the operation member 62.

Specifically, in a direction in which the perforation 32 extends, each of the plurality of positioning holes 24 does not penetrate through the projection 21, which ensures that the structure of the two sides of the projection 21 facing the two ear portions 12 remains intact so that a side of the projection 21 can reliably contact the side wall 121 of the ear portion 12 in the rotation direction during use, thus evenly dispersing the force. Each of the plurality of positioning holes 24 is oval, and in the first direction 71, each of the plurality of positioning holes 24 extends for a distance of 0.5 times a length of the projection 21, which provides a strong structure of the projection 21.

Specifically, a side of the drive head 2 facing one of the two through holes 31 includes a room 22, the room 22 is in communication with the perforation 32, a first elastic member 4 is received in the room 22, and in the first direction 71 the first elastic member 4 is abutted against a bottom wall 23 of the room 22 and the side wall 121 of one of the two ear portions 12. The first elastic member 4 biases the projection 21 in the first direction 71 so that the projection 21 is abutted against the side wall 121 of the other of the two ear portions 12. When the positioning member 61 is disengaged from one of the plurality of positioning holes 24, the drive head 2 can be slightly held in position.

In the first embodiment, in the first direction 71, the room 22 has a dimension of 0.25 times the length of the projection 21, which provides a sufficient structural strength of the projection 21. An opening of the room 22 is sized larger than an opening of each of the two through holes 31, which avoids the contact of the edge of the through hole 31 to prevent it from damage. The opening of the room 22 is open toward one of the two ear portions 12 which includes the first thread section 33.

Figure 14:
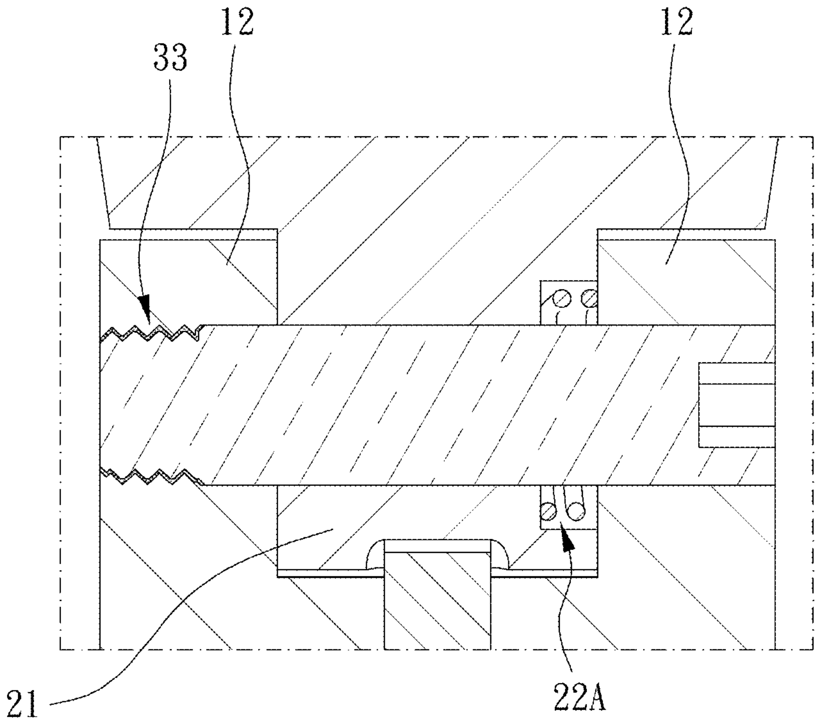
FIG. 14 is a partial enlarged cross-sectional view of a third exemplary embodiment of the present invention.

However, the opening of the room 22A may be open toward a direction away from the ear portion 12 which includes the first thread section 33 (in a third embodiment as shown in FIG. 14), so that the ear portion 12 and the projection 21 have a large contact area and so that they can be well protected.

The positioning member 61 is disposed on the handle 1 and movable in a second direction 72, the second direction 72 is perpendicular to the first direction 71, the operation member 62 is disposed on the handle 1 and movable between a locked position and a release position in the first direction 71, the operation member 62 and the positioning member 61 are abutted against and movable with each other, a side of the operation member 62 abutted against the positioning member 61 includes a recess 621 and a plurality of upper engaging portions 622, the recess 621 and the plurality of upper engaging portions 622 are arranged in a direction in which the operation member 62 moves, and the plurality of upper engaging portions 622 ascends steppedly in a direction away from the recess 621.

When the operation member 62 is located in the release position, the positioning member 61 is movable into the recess 621 to release the drive head 2 so that the drive head 2 is swingable, and when the operation member 62 moves from the release position to the locked position, the positioning member 61 is disengaged from the recess 621 and pushed by the plurality of upper engaging portions 622 to approach the drive head 2 so that the drive head 2 is not swingable.

Preferably, a second elastic member 8 is abutted against and between the handle 1 and the operation member 62, and the second elastic member 8 biases the operation member 62 toward the locked position so that the operation member 62 can automatically return to the locked position when no external force is applied thereto, which can effectively improve operation safety.

The positioning member 61 includes a column 611 and two ribs 612, the two ribs 612 are disposed on opposing ends of the column 611, respectively, and the two ribs 612 are perpendicular to each other, one of the two ribs 612 is engaged within one of the plurality of positioning holes 24 to lock the drive head 2, and the other of one of the two ribs 612 is abutted against the operation member 62. In the first embodiment, the two ribs 612 are identical, which is easy to produce; the column 611 and each of the two ribs 612 are preferably formed of one piece, which provides a large structural strength; the column 611 is cylindrical, each of the two ribs 612 is of an isosceles right triangle prism shape; and the corner of each of the two ribs 612 remote from the column 611 is chamfered, which reduces stress concentration when in contact with other components.

Specifically, the operation member 62 is a pin, each of the plurality of upper engaging portions 622 is toothed-shaped, the plurality of upper engaging portions 622 are tooth-shaped ribs extending on a reference plane 9, the reference plane 9 and an axial direction of the operation member 62 define a first angle 91, and the first angle 91 is smaller than 45 degrees. Specifically, the plurality of upper engaging portions 622 define a plurality of grooves 623, each of the plurality of grooves 623 includes a first surface 624 and a second surface 625, the first surface 624 is nearer the recess 621 than the second surface 625, and the first surface 624 and the second surface 625 define the groove 623 and define an obtuse angle therebetween so that each of the plurality of grooves 623 has sufficient space to accommodate a portion of the rib 612.

The first surface 624 extends obliquely away from the axial direction of the operation member 62 such that when the drive head 2 reversely pushes the positioning member 61 to move toward the recess 621, the first surface 624 which is tilted can restrict the movement of the positioning member 61 since the positioning member 61 will extend further into the positioning hole 24 to resist the force from the drive head 2 because the positioning member 61 moves along the first surface 624 toward the recess 621, thereby preventing reverse slippage movement. The first surface 624 and the operation member 62 define a second angle 92, and the second angle 92 is preferably smaller than 15 degrees.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A swingable wrench including:

a handle including a main body and two ear portions, the two ear portions being arranged in interval in a first direction and projecting from the main body to define a space;

a drive head including a projection inserted in the space; and a pivot structure including two through holes, a perforation, a first thread section and a shaft, the two through holes being respectively disposed through the two ear portions in the first direction, the perforation being through the projection, the first thread section being disposed on an inner surface of one of the two through holes, the first thread section being distanced from a side wall of one of the two ear portions facing the space, the shaft including a second thread section, the shaft being disposed through the perforation and inserted in the two through holes, the second thread section being screwed to the first thread section so that the drive head is swingable about the shaft;

wherein the swingable wrench further includes a positioning member and an operation member, wherein the drive head further includes a plurality of positioning holes, the plurality of positioning holes are disposed in intervals on an outer surface of the projection and around the perforation, the positioning member is disposed on the handle and is movable to be within the space to engage in one of the plurality of positioning holes, and the operation member is movably disposed on the handle and movable with the positioning member;

wherein the positioning member is disposed on the handle and movable in a second direction, the second direction is perpendicular to the first direction, the operation member is disposed on the handle and movable between a locked position and a release position in the first direction, the operation member and the positioning member are abutted against and movable with each other, a side of the operation member abutted against the positioning member includes a recess and a plurality of upper engaging portions, the recess and the plurality of upper engaging portions are arranged in a direction in which the operation member moves, and the plurality of upper engaging portions ascends steppedly in a direction away from the recess; when the operation member is located in the release position, the positioning member is movable into the recess to release the drive head so that the drive head is swingable, and when the operation member moves from the release position to the locked position, the positioning member is disengaged from the recess and pushed by the plurality of upper engaging portions to approach the drive head to lock the drive head so that the drive head is not swingable; the positioning member includes a column and two ribs, the two ribs are disposed on opposing ends of the column, respectively, the two ribs are perpendicular to each other, one of the two ribs is engaged within one of the plurality of positioning holes to lock the drive head, and an other of one of the two ribs is abutted against the operation member; the operation member is a pin, each of the plurality of upper engaging portions is toothed-shaped, the plurality of upper engaging portions are tooth-shaped ribs extending on a reference plane, the reference plane and an axial direction of the operation member define a first angle therebetween, and the first angle is smaller than 45 degrees; the plurality of upper engaging portions define a plurality of grooves, each of the plurality of grooves includes a first surface and a second surface, the first surface is nearer the recess than the second surface, and the first surface and the second surface define the groove and define an obtuse angle therebetween; the first surface extends obliquely away from the axial direction of the operation member, the first surface and the axial direction of the operation member define a second angle therebetween, and the second angle is smaller than 15 degrees.

2. The swingable wrench of claim 1, wherein the first thread section has a diametric dimension smaller than or equal to a diametric dimension of the through hole.

3. The swingable wrench of claim 2, wherein the diametric dimension of the first thread section is smaller than the diametric dimension of the through hole.

4. The swingable wrench of claim 1, wherein a side of the drive head facing one of the two through holes includes a room, the room is in communication with the perforation, a first elastic member is received in the room, and in the first direction the first elastic member is abutted against a bottom wall of the room and one of the two ear portions.

5. The swingable wrench of claim 1, wherein in the first direction, the first thread section extends for a distance of 0.5 times an axial dimension of one of the two through holes.

6. The swingable wrench of claim 1, further including a NYLOK BLUE patch (Teflon paste), wherein the NYLOK BLUE patch is disposed between the first thread section and the second thread section.

7. The swingable wrench of claim 1, wherein each of the plurality of positioning holes does not penetrate through the projection.

8. The swingable wrench of claim 1, wherein in the first direction, each of the plurality of positioning holes extends for a distance of 0.5 times a length of the projection.

9. The swingable wrench of claim 3, wherein a side of the drive head facing one of the two through holes includes a room, the room is in communication with the perforation, a first elastic member is received in the room, and in the first direction the first elastic member is abutted against a bottom wall of the room and one of the two ear portions; in the first direction, the first thread section extends for a distance of 0.5 times an axial dimension of one of the two through holes; the swingable wrench further includes a NYLOK BLUE patch, the NYLOK BLUE patch is disposed between the first thread section and the second thread section, in a direction in which the perforation extends, each of the plurality of positioning holes does not penetrate through the projection; in the first direction, each of the plurality of positioning holes extends for a distance of 0.5 times a length of the projection; in the first direction, the room has a dimension of 0.25 times the length of the projection; an opening of the room is sized larger than an opening of each of the two through holes; the second thread section is disposed on an end portion of the shaft; each of the plurality of positioning holes is oval; the room is open toward one of the two ear portions which includes the first thread section; a second elastic member is abutted against and between the handle and the operation member, and the second elastic member biases the operation member toward the locked position.

* * * * *